A. R. WILFLEY.
STANDPIPE CONNECTION FOR CENTRIFUGAL PUMPS.
APPLICATION FILED JUNE 16, 1919.
1,346,925.
Patented July 20, 1920.
2 SHEETS—SHEET 2.
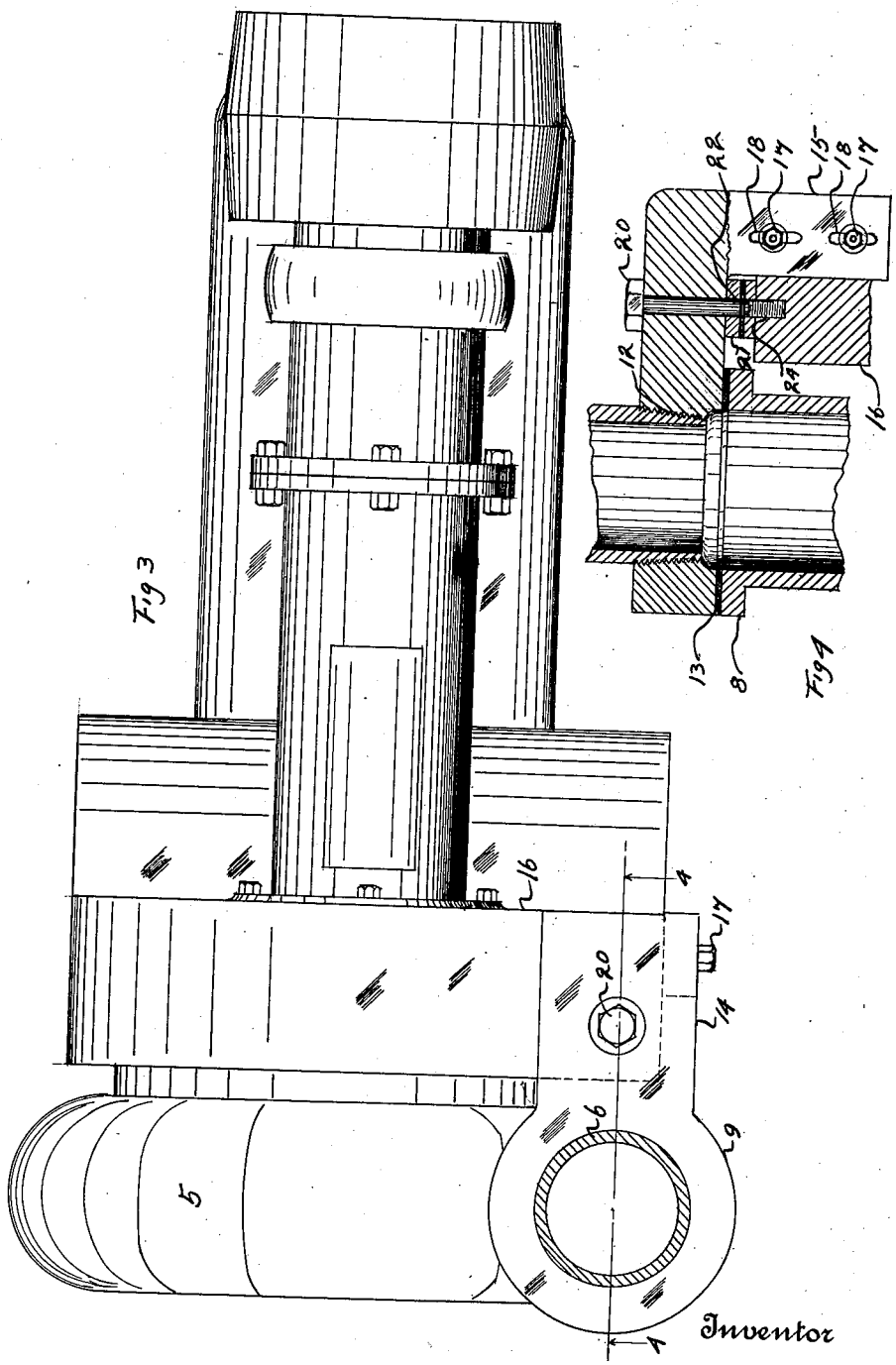
Inventor
A.R. Wilfley.
By
Attorney

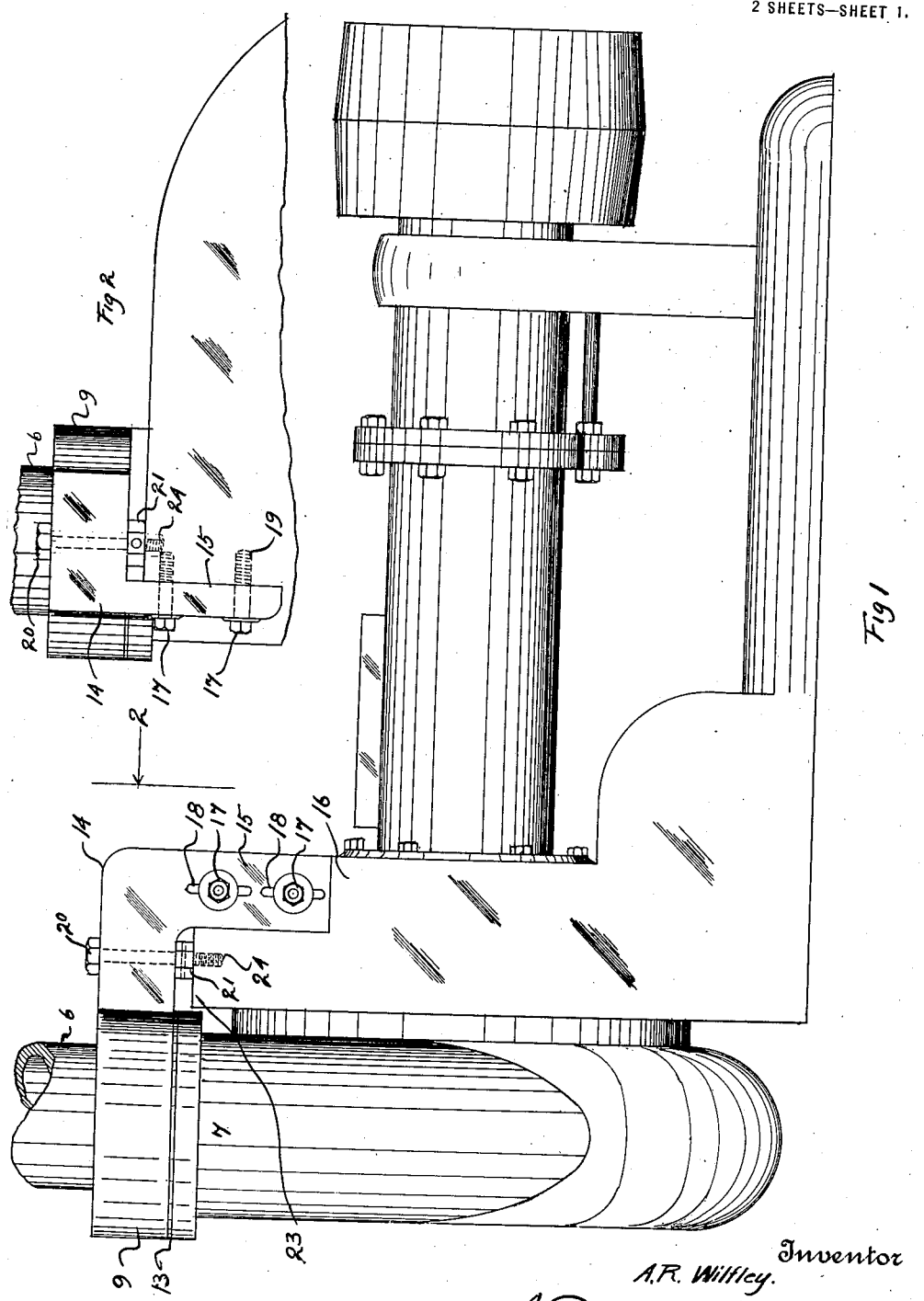

UNITED STATES PATENT OFFICE.

ARTHUR R. WILFLEY, OF DENVER, COLORADO.

STANDPIPE CONNECTION FOR CENTRIFUGAL PUMPS.

1,346,925.   Specification of Letters Patent.   Patented July 20, 1920.

Application filed June 16, 1919. Serial No. 304,502.

*To all whom it may concern:*

Be it known that I, ARTHUR R. WILFLEY, a citizen of the United States, residing at the city and county of Denver and State of Colorado, have invented certain new and useful Improvements in Standpipe Connections for Centrifugal Pumps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for connecting the stand pipes of centrifugal pumps, whereby the stand pipe may be readily disconnected from the outlet opening of the pump casing when for any reason it may be desirable so to do.

In constructions of this kind, it is well known that a single stand pipe will outlast a number of pump casings. Hence, it is important that some means be provided for readily disconnecting the standpipe from the casing and at the same time maintain the standpipe in position to be readily connected with the new casing, or the same casing, as circumstances may require.

In my improvement, I provide a disjointing collar or keeper, into which the lower extremity of the stand pipe is threaded, the said collar being adapted to be seated around the outlet opening of the casing and being provided with an arm adjustably connected with the framework of the pump adjacent the stand pipe, the arm being movably connected with the framework and being provided further with means, as a bolt, journaled in the arm and threaded into the framework, whereby, as the bolt is turned, the collar or keeper may be moved for the purpose of lifting the standpipe or disjointing it from the pump casing, or for the purpose of returning it or lowering it to its normal position, as may be required.

Having briefly outlined my improvement, I will proceed to describe the same in detail, reference being made to the accompanying drawing, in which is illustrated an embodiment thereof. In this drawing:

Figure 1 is a side view of a centrifugal pump equipped with my improvement.

Fig. 2 is a view of the lower extremity of the stand pipe and the disjointing collar, viewed in the direction of arrow 2, Fig. 1.

Fig. 3 is a top plan view of the structure, shown in Fig. 1.

Fig. 4 is a section taken on the line 4—4, Fig. 3, viewed in the direction of the arrows.

The same reference characters indicate the same parts in all the views.

Let the numeral 5 designate the casing of a centrifugal pump, and 6 the stand pipe, through which the discharge from the outlet member 7 of the pump passes. This outlet member 7 is provided with an exteriorly projecting part 8, which forms a shoulder upon which is seated the collar member 9, a disjointed keeper 10, the collar being interiorly threaded as shown at 12 to receive the correspondingly threaded adjacent extremity of the stand pipe. A suitable packing washer 13 is arranged between the shoulder 8 and the collar 9. This collar is provided with a laterally projecting arm 14, which is equipped with a depending part 15, which is connected with the stationary framework 16 of the pump by means of stud bolts 17, passing through vertical slots 18, formed in the part 15 and threaded into the framework 16, as shown at 19. In this way the keeper is secured to the framework. The arm 14, between the depending part 15 and the collar 9, is perforated to receive a bolt 20, which is journaled therein, between the head of the bolt and a stop 21, which is pinned to the bolt to turn therewith as shown at 22, this stop being arranged between a horizontal part 23 of the framework, and the adjacent surface of the arm, whereby, when the collar member 9 of the keeper is seated, the stop fits closely between the lower surface of the arm and the top of the framework. Now, when it is desired to disjoint the stand pipe from the pump, it is only necessary to turn the bolt 20, which is threaded into the upper portion of the framework, as shown at 24, the bolt being turned in a direction to cause it to move upwardly in the framework; hence, as the stop is secured to the bolt and engages the under surface of the arm, as the bolt rises, it carries the arm, the collar member 9, and the stand pipe 6 with it. Before, however, operating the bolt 20 for this purpose, the stud bolt 17 should be loosened in order to allow the slotted part 15 of the keeper to move freely on the framework. It will be understood that but a slight movement of the collar member of the standpipe 9 will be required for disjointing purposes, after which the pump casing may be removed and a new one supplied, or the standpipe may be reconnected with the old casing, as may be required.

I claim:

1. In a connection of the class described, the combination with a centrifugal pump and the stand pipe through which the discharge passes, of a keeper, connected with the stand pipe and adapted to engage the pump casing around the outlet opening.

2. In a connection of the class described, the combination with a centrifugal pump and the stand pipe through which the discharge passes, of a keeper, connected with the stand pipe and adapted to engage the pump casing around the outlet opening, and means for adjusting the keeper and stand pipe to cause the keeper to move toward and away from its seat.

3. In a stand pipe connection for centrifugal pumps, the combination with the pump casing and the stand pipe through which the discharge passes, of a keeper connected with the stand pipe and seated on the casing around the outlet opening, and means for moving the stand pipe and keeper toward and away from the pump casing.

4. In a stand pipe connection for centrifugal pumps, the combination with the pump casing and the stand pipe through which the discharge passes, of a keeper connected with the stand pipe and seated on the casing around the outlet opening, means for moving the stand pipe and keeper toward and away from the pump casing, said means comprising an arm rigidly connected with the keeper and movably connected with the framework of a pump, and a bolt journaled in the arm and threaded into the framework, whereby, as the bolt is rotated, the keeper and stand pipe may be moved toward and away from the casing, as may be desired.

5. The combination with a centrifugal pump casing and stand pipe, of a keeper with which the lower end of the pipe is connected, the keeper being arranged around the outlet of the casing, and means for moving the keeper toward and away from its seat.

6. The combination with the pump casing and stand pipe, of an interposed keeper, connected with the pipe, and movable toward and away from the casing.

7. The combination with the pump casing and stand pipe, of an interposed keeper connected with the pipe and adapted to seat around the outlet extremity of the casing, the keeper having an arm connected with the framework of the pump to permit movement, and means connected with the arm and framework for adjusting the keeper to move toward and away from the casing.

8. The combination with the pump casing and stand pipe, of an interposed collar, and means for adjusting the collar to disconnect the stand pipe and pump casing.

9. The combination with the pump casing and stand pipe, of a disjointing collar connecting the two members and adjustably mounted on the framework.

10. The combination with the pump casing and stand pipe, of an interposed collar mounted on the casing and with which the stand pipe is connected, the collar having a part adjustably connected with the framework of the pump for disjointing purposes.

11. The combination with a pump casing and stand pipe, of an interposed disjointing collar, adjustably mounted on the framework of the pump.

In testimony whereof I affix my signature.

ARTHUR R. WILFLEY.